(12) United States Patent
Kim et al.

(10) Patent No.: US 10,249,294 B2
(45) Date of Patent: Apr. 2, 2019

(54) SPEECH RECOGNITION SYSTEM AND METHOD

(71) Applicant: Electronics and Telecommunications Research Institute, Daejeon (KR)

(72) Inventors: Dong Hyun Kim, Seoul (KR); Young Jik Lee, Daejeon (KR); Sang Hun Kim, Daejeon (KR); Seung Hi Kim, Daejeon (KR); Min Kyu Lee, Daejeon (KR); Mu Yeol Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/646,302

(22) Filed: Jul. 11, 2017

(65) Prior Publication Data

US 2018/0075844 A1 Mar. 15, 2018

(30) Foreign Application Priority Data

Sep. 9, 2016 (KR) .................. 10-2016-0116527
Apr. 12, 2017 (KR) .................. 10-2017-0047408

(51) Int. Cl.
| | |
|---|---|
| *G10L 15/14* | (2006.01) |
| *G10L 17/04* | (2013.01) |
| *G10L 15/065* | (2013.01) |
| *G10L 15/06* | (2013.01) |
| *G10L 15/08* | (2006.01) |

(52) U.S. Cl.
CPC .......... *G10L 15/144* (2013.01); *G10L 15/063* (2013.01); *G10L 15/065* (2013.01); *G10L 15/142* (2013.01); *G10L 17/04* (2013.01); *G10L 15/08* (2013.01); *G10L 2015/0631* (2013.01)

(58) Field of Classification Search
CPC ...................................................... G10L 15/144
USPC ...................................................... 704/245
See application file for complete search history.

(56) References Cited

U.S. PATENT DOCUMENTS

| | | |
|---|---|---|
| 7,181,395 B1 | 2/2007 | Deligne et al. |
| 2008/0133239 A1 | 6/2008 | Jeon et al. |
| 2009/0157403 A1 | 6/2009 | Chung et al. |

OTHER PUBLICATIONS

R. Singh et al., "Automatic generation of phone sets and lexical transcriptions", IEEE, Jun. 5-9, 2000, pp. 1691-1694.
Brain Mak et al., "Phone Clustering Using the Bhattacharyya Distance", 1996, pp. 2005-2008.

*Primary Examiner* — Susan I McFadden
(74) *Attorney, Agent, or Firm* — Kile Park Reed & Houtteman PLLC

(57) ABSTRACT

A speech recognition method capable of automatic generation of phones according to the present invention includes: unsupervisedly learning a feature vector of speech data; generating a phone set by clustering acoustic features selected based on an unsupervised learning result; allocating a sequence of phones to the speech data on the basis of the generated phone set; and generating an acoustic model on the basis of the sequence of phones and the speech data to which the sequence of phones is allocated.

19 Claims, 7 Drawing Sheets

SPEECH RECOGNITION SYSTEM AND METHOD

CROSS-REFERENCE TO RELATED APPLICATION

This application claims priority under 35 U.S.C. § 119 to Korean Patent Application No. 2016-0116527, filed on Sep. 9, 2016 and Korean Patent Application No. 2017-0047408, filed on Apr. 12, 2017, the disclosure of which is incorporated herein by reference in its entirety.

BACKGROUND

1. Field of the Invention

The present invention relates to a speech recognition system and method, and more particularly, to a speech recognition system and method capable of automatic generation of phones.

2. Discussion of Related Art

As a phone clustering method according to a conventional art, there is a method using Bhattacharyya distance measure suggested by B. Mak, et al. (B. Mak, E. Barnard, "Phone clustering using the Bhattacharyya distance", in Proc. ICSLP, 1996). In this method, acoustic features of each phone are classified and the Bhattacharyya distance measure method is used as a method of clustering the acoustic distances. However, this approach has a problem that it uses a set of phones predetermined on the basis of expertise.

That is, in the conventional art, a set of phones predetermined on the basis of the knowledge of phonetic experts is used to perform acoustic modeling, and a pronunciation dictionary is created using linguistic pronunciation rules.

However, this method has a problem in that it does not fit into natural continuous speech and particularly has difficulties in dealing with all kinds of variation, such as phonetic contractions and omissions and variable pronunciations. In addition, since the acoustic model is generated on the basis of a pronunciation dictionary in an environment where transcription exists, the acoustic model is influenced by the inaccurate pronunciation dictionary and there is a limitation that the acoustic model can be constructed only in the presence of transcribed data.

Although various other methods, such as a top-down method, a bottom-up method, and the like, for phone clustering have been suggested, these methods also use a predetermined set of phones.

As another method, R. Singh suggested a method of automatically determining a phone set and a pronunciation dictionary (R. Singh, B. Ray and R. Stern, "Automatic generation of phone sets and lexical transcriptions", in Proc. ICASSP, 2000). This approach uses a maximum a posteriori (MAP) method to build an optimal pronunciation dictionary and optimizes acoustic models of the phone sets using likelihood as a criterion. That is, the method aims to generate incrementally optimized phones and a pronunciation dictionary by recursively using the MAP method.

In addition, in the conventional art, a method of creating a graph of pronunciation candidates and selecting an optimal candidate is used to generate a word pronunciation dictionary. This method can incrementally automatically select an optimal candidate on the basis of initial phones and pronunciation dictionary manually inputted.

However, this method is a very common and broad approach in which a plurality of phones need to be manually generated at the initial stage and there are no constraints on how to generate a complete pronunciation dictionary. Therefore, optimization is not easy and more adequate data needs to be collected.

Also, because an objective function used on the basis of the applied likelihood is not well suited to problem solving, recursive processing for solving the optimization problem is not the optimal solution.

In addition, the conventional speech recognition process involves a pronunciation rule conversion module, and hence there is an artificial pronunciation distortion that is different from an actual acoustic pronunciation.

SUMMARY OF THE INVENTION

According to an embodiment of the present invention, there is provided a speech recognition system and method capable of automatic generation of phones on the basis of speech data, unlike an existing approach in which a phone that is a basic acoustic unit for speech recognition is determined and classified by an expert's analysis.

However, the technical objectives to be solved by this embodiment are not limited to the above-mentioned technical objectives, and other technical objectives may exist.

In one general aspect, there is provided a speech recognition method capable of automatic generation of phones, including: unsupervisedly learning a feature vector of speech data; generating a phone set by clustering acoustic features selected based on an unsupervised learning result; allocating a sequence of phones to the speech data on the basis of the generated phone set; and generating an acoustic model on the basis of the sequence of phones and the speech data to which the sequence of phones is allocated.

In another general aspect, there is provided a speech recognition system capable of automatic generation of phones, including: a memory configured to store a program for speech recognition; and a processor configured to execute the program stored in the memory, wherein the processor performs unsupervised learning by extracting a feature vector from untranscribed speech data upon executing the program, generates a phone set by clustering acoustic features selected based on an unsupervised learning result, allocates a sequence of phones to the speech data on the basis of the generated phone set, and generates an acoustic model on the basis of the sequence of phones and the speech data to which the sequence of phones is allocated.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
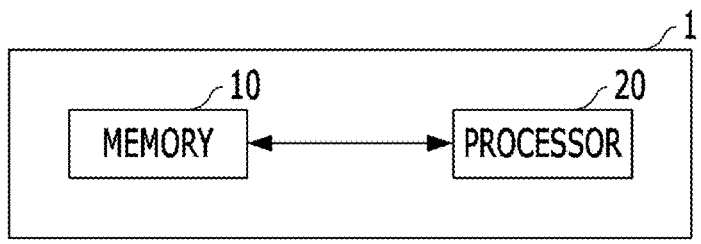
FIG. 1 is a block diagram illustrating a speech recognition system according to one embodiment of the present invention.

Hereinafter, exemplary embodiments will be described in detail with reference to the accompanying drawings in such a way that one of ordinary skill in the art to which the present invention pertains can readily implement the present invention. Nevertheless, the present invention can be realized in various forms and shall not be restricted to the exemplary embodiments described herein. Moreover, in order to describe the exemplary embodiments more clearly, any portions of the drawings that are not related to the description are omitted, and throughout the specification, similar reference numerals are designated to similar elements.

Throughout the detailed description, unless explicitly described to the contrary, the word "comprise" and variations such as "comprises" or "comprising", will be understood to imply the inclusion of stated elements but not the exclusion of any other elements.

The present invention relates to a speech recognition system 1 and method capable of automatic generation of phones.

According to one embodiment of the present invention, phones may be automatically generated, unlike an existing method of determining and classifying phones, which are basic acoustic units for speech recognition, on the basis of analysis of experts.

Particularly, in one embodiment of the present invention, a pattern-based phone set of speech data may be defined by unsupervised deep learning, and a phone sequence may be allocated to text by analyzing the speech data itself without using a rule-based method which allocates a phone sequence to text using grapheme-to-phoneme (G2P) based on existing expert knowledge.

Accordingly, the embodiment of the present invention solves a problem in that transcribed speech data is relatively insufficient, so that an acoustic model may be generated even in the absence of transcription, and the embodiment may effectively deal with word segment-oriented pronunciation variations, thereby recognizing the speech of dialogue in which distortion is severe.

Hereinafter, the present invention will be described in detail with reference to the accompanying drawings.

Figure 2:
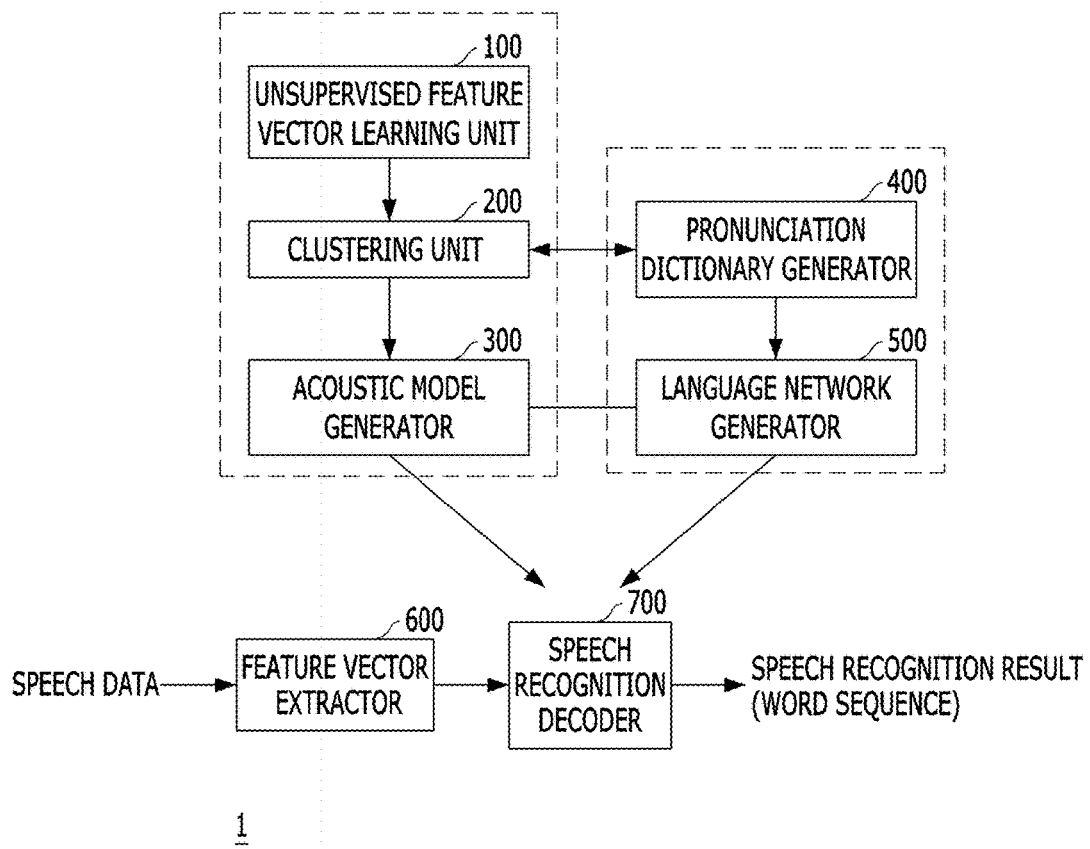
FIG. 2 is a block diagram for describing functions of the speech recognition system according to one embodiment of the present invention.

FIG. 1 is a block diagram illustrating a speech recognition system according to one embodiment of the present invention. FIG. 2 is a block diagram for describing functions of the speech recognition system according to one embodiment of the present invention.

The speech recognition system 1 according to one embodiment of the present invention includes a memory 10 and a processor 20.

The memory 10 is configured to store a program for speech recognition. In this case, the memory 10 collectively refers to a non-volatile storage device, which retains stored information even when power is not supplied, and a volatile storage device.

For example, the memory 10 may include a compact flash (CF) card, a secure digital (SD) card, a memory stick, a NAND flash memory, such as a solid-state drive (SSD) or a micro SD card, a magnetic computer storage device, such as a hard disk drive (HDD), and an optical disc drive, such as a compact disc read-only memory (CD-ROM), a digital versatile disk-ROM (DVD-ROM), or the like.

The processor 20 executes the program stored in the memory 10, performs unsupervised learning by extracting a feature vector from untranscribed speech data upon executing the program, and generates a phone set by clustering acoustic features selected based on an unsupervised learning result. Then, the processor 20 allocates a phone sequence to the speech data on the basis of the generated phone set and generates an acoustic model on the basis of the phone sequence and the speech data to which the phone sequence is allocated.

In addition, the speech recognition system 1 may include a microphone for receiving a user's speech or an interface including the microphone.

The speech recognition system 1 operated by the components of FIG. 1 in accordance with the embodiment of the present invention may be depicted by function blocks shown in FIG. 2.

The speech recognition system 1 according to one embodiment of the present invention may include an unsupervised feature vector learning unit 100, a clustering unit 200, an acoustic model generator 300, a pronunciation dictionary generator 400, and a language network generator 500.

In addition, as a configuration for generating a speech recognition result on the basis of a generated acoustic model and language network, the speech recognition system 1 may further include a feature vector extractor 600 and a speech recognition decoder 700.

For reference, the components illustrated in FIGS. 1 and 2 according to the embodiment of the present invention may be implemented as software or in the form of hardware, such as a field programmable gate array (FPGA) or application specific integrated circuit (ASIC), and may perform specific functions.

However, the components are not limited to software or hardware, and each component may be configured reside on an addressable storage medium or configured to execute one or more processors.

Thus, the components may include, by way of example, components, such as software components, object-oriented software components, class components, and task components, processes, functions, attributes, procedures, subroutines, segments of program code, drivers, firmware, microcode, circuitry, data, databases, data structures, tables, arrays, and parameters.

The components and the functionality provided in the components may be combined into fewer components or further separated into additional components.

Hereinafter, a speech recognition method performed in the speech recognition system according one embodiment will be described in detail with reference to FIGS. 3 to 8.

Figure 3:
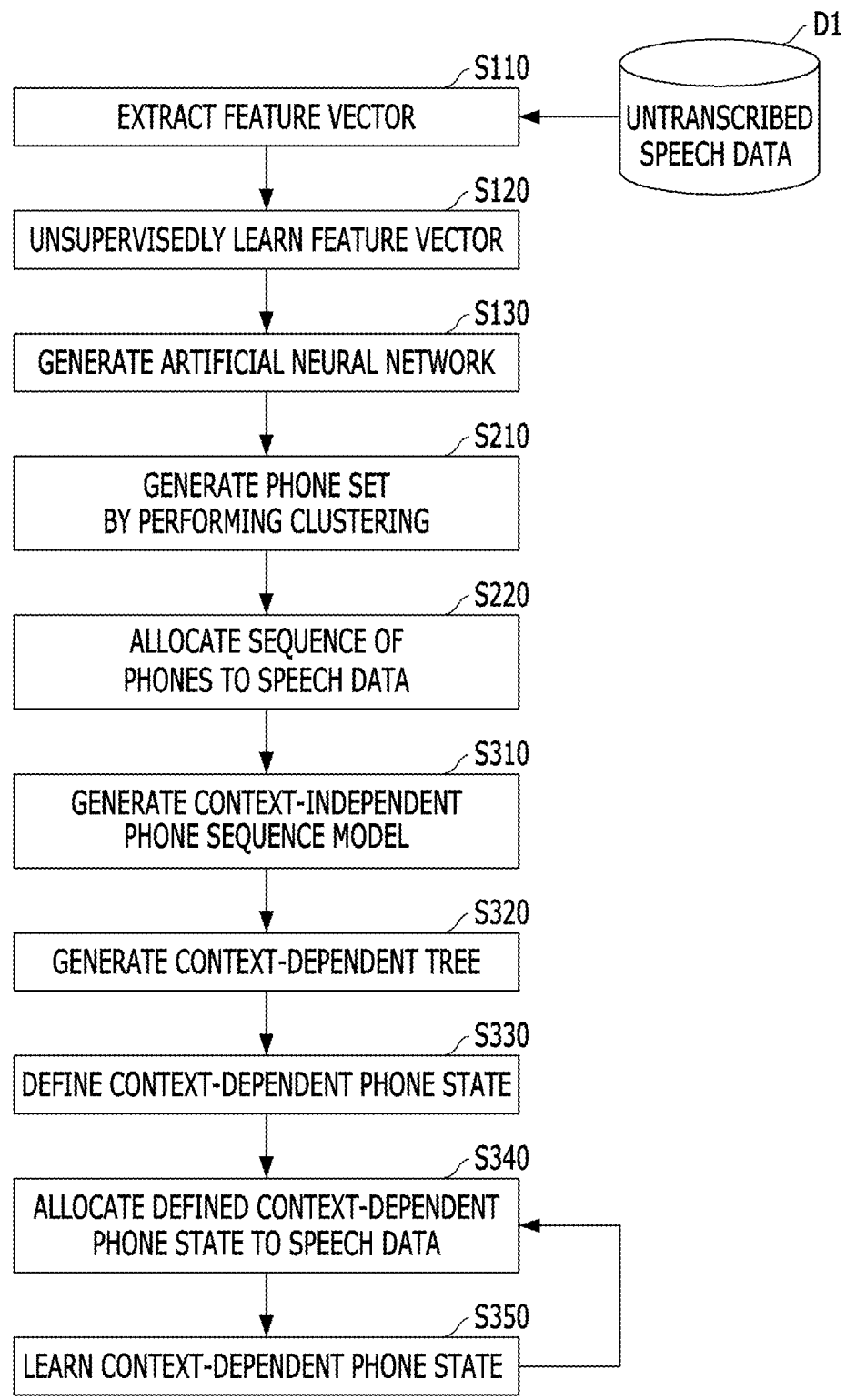
FIG. 3 is a flowchart illustrating a speech recognition method according to one embodiment of the present invention.

FIG. 3 is a flowchart illustrating a speech recognition method according to one embodiment of the present invention.

1. Unsupervised Feature Vector Learning Process

In the speech recognition method in accordance with one embodiment of the present invention, first, an unsupervised feature vector learning unit 100 learns a feature vector of speech data without supervision.

Specifically, the unsupervised feature vector learning unit 100 extracts the feature vector from the untranscribed speech data collected without transcription in order to extract an acoustic feature of the uttered speech data as a pattern itself without a preset symbol (S110).

Figure 4:
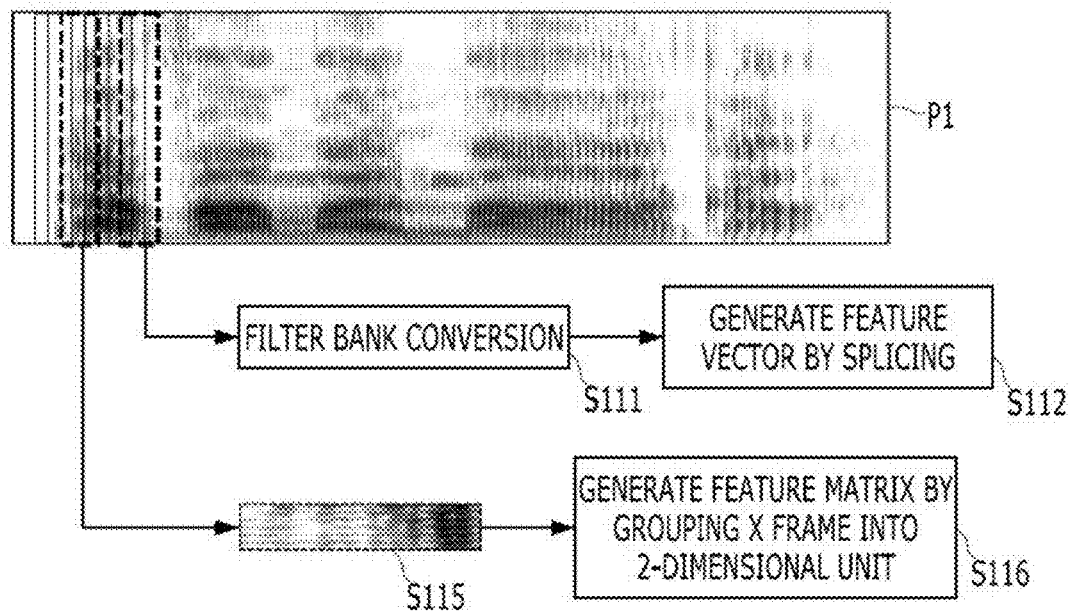
FIG. 4 is a diagram for describing a method of extracting a feature vector from speech data.

FIG. 4 is a diagram for describing a method of extracting the feature vector from the speech data.

The unsupervised feature vector learning unit 100 converts the speech data into a spectrogram P1, as shown in FIG. 4, and converts the speech data, which is converted into the spectrogram P1, into a first feature vector using a Mel-scale filter bank of a predetermined time frame unit (e.g., 10 ms) (S111). Then, a second feature vector is generated by splicing left and right windows of the first feature vector according to the predetermined number of frames, and the generated second feature vector may be used as a feature vector to be applied to the unsupervised learning (S112).

In addition, a feature vector which is generated as a Mel-frequency cepstral coefficient by performing a discrete cosine transform on the first feature vector obtained using the Mel-scale filter bank may be used as the first feature vector.

In another method, the unsupervised feature vector learning unit 100 converts the speech data into a spectrogram P1. Then, in order to use the acoustic pattern of the spectrogram itself, the speech data converted into the spectrogram is grouped into 2-dimensional units of x frames so as to generate a feature matrix (S115), and the generated feature matrix may be used as a feature vector to be applied to unsupervised learning (S116).

In the method of generating the feature vector using the filter bank (S111 and S112), information of each frame, which is the feature vector used for general deep learning, may be used as input information. In addition, in the method of generating and using the feature matrix (S115 and S116), a feature having a shift-frame unit which is smaller than the 2-dimensional units of the x frames may be extracted as 2-dimensional data that is applicable to convolution deep learning, and information of the extracted feature matrix may be utilized as input information.

When the feature vector is extracted as described above, the unsupervised feature vector learning unit 100 performs unsupervised learning on the extracted feature vector (S120). In this case, the unsupervised feature vector learning unit 100 may learn the feature vector using an autoencoder illustrated in FIGS. 5 to 7.

Figure 5A:
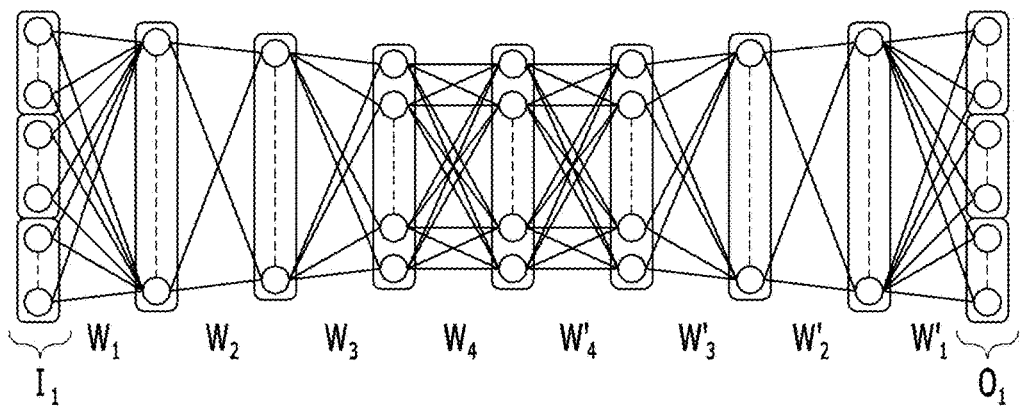
FIG. 5A and FIG. 5B is a diagram for describing a process of learning a feature vector using a stacked autoencoder.
Figure 5B:
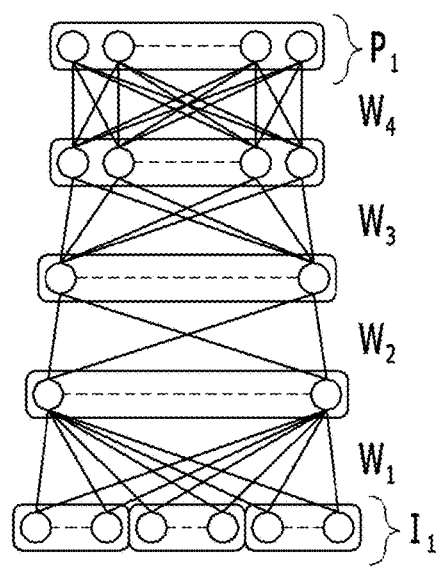
Figure 6A:
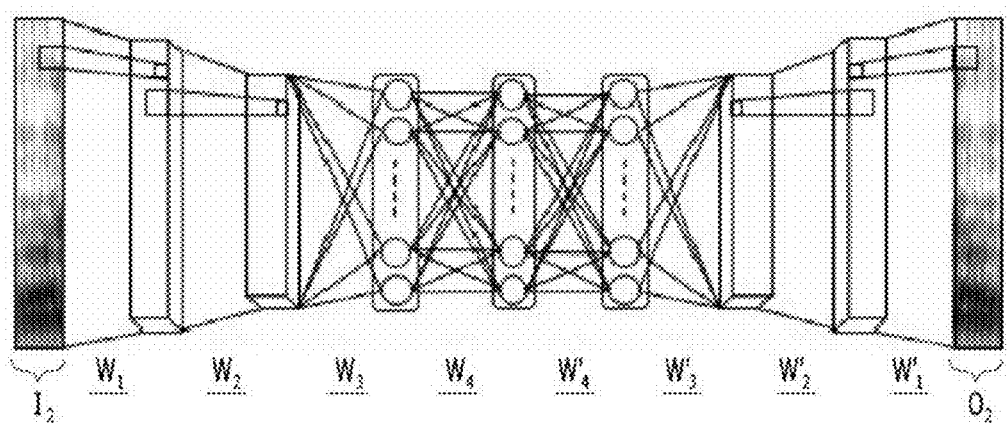
FIG. 6A and FIG. 6B is a diagram for describing a process of learning a feature vector using a convolutional autoencoder.
Figure 6B:
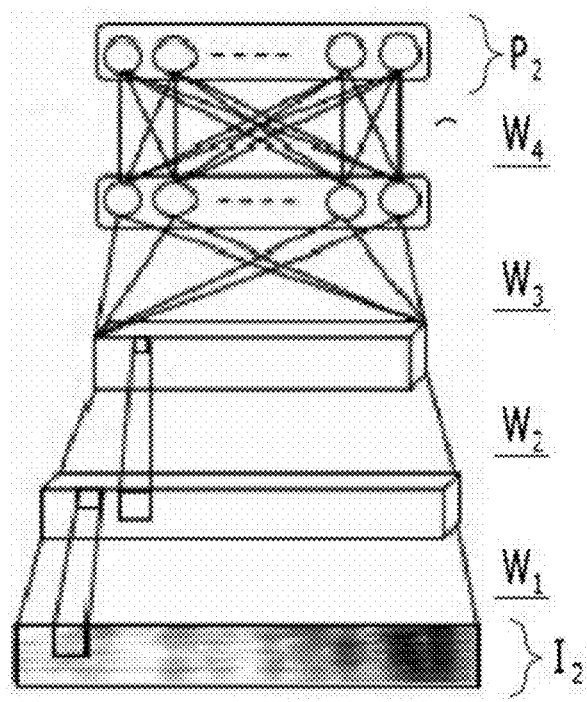
Figure 7A:
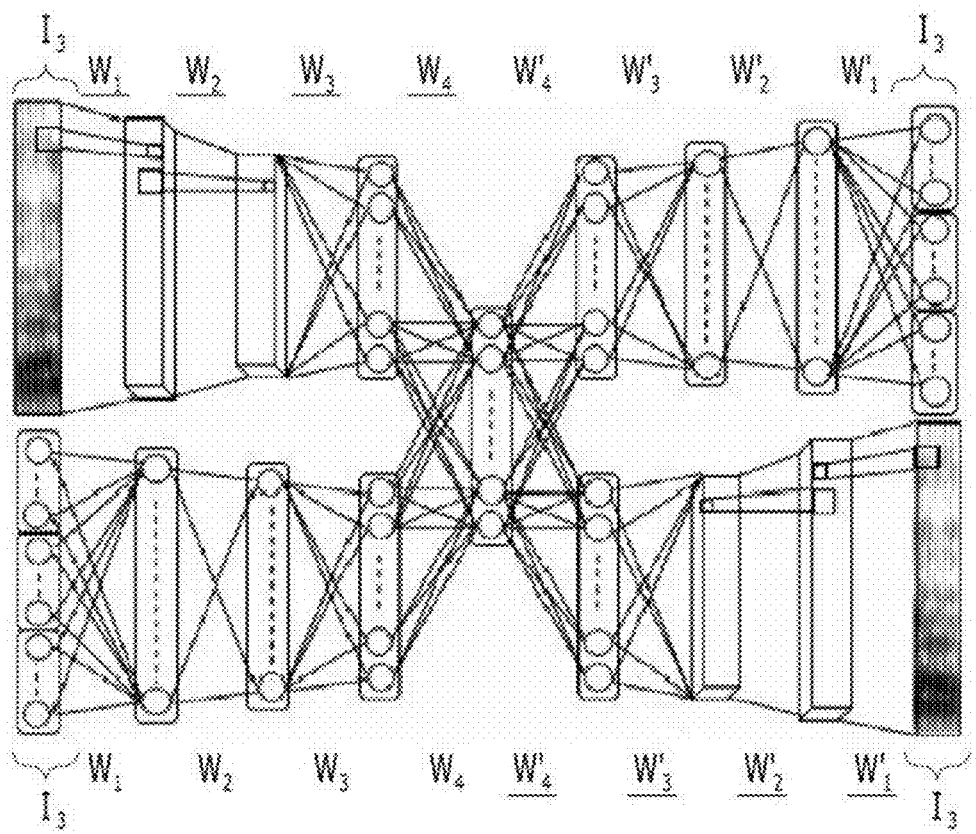
FIG. 7A and FIG. 7B is a diagram for describing a process of learning a feature vector using an autoencoder cross learning method.
Figure 7B:
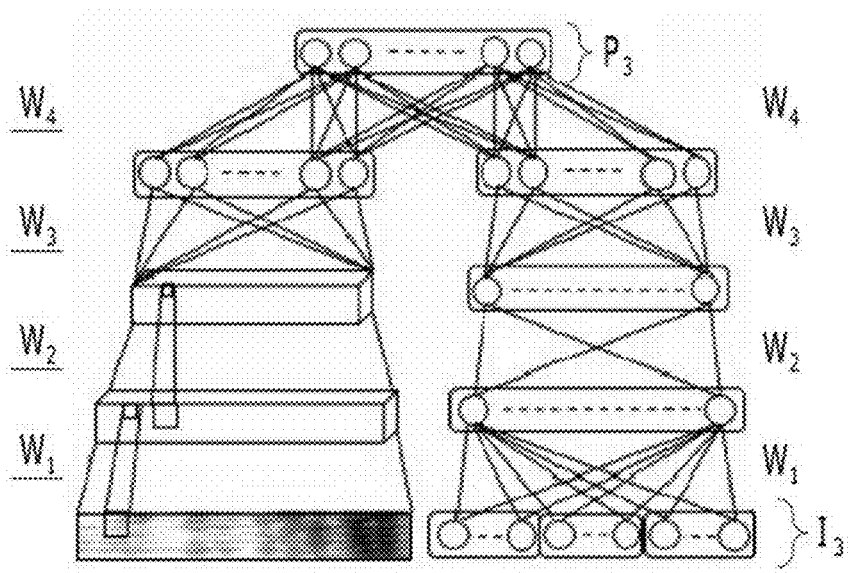

FIG. 5A and FIG. 5B is a diagram for describing a process of learning a feature vector using a stacked autoencoder. FIG. 6A and FIG. 6B is a diagram for describing a process of learning a feature vector using a convolutional autoencoder. FIG. 7A and FIG. 7B is a diagram for describing a process of learning a feature vector using an autoencoder cross learning method.

The unsupervised feature vector learning unit 100 may learn feature vectors without supervision by arranging an extracted feature vector on an input node I1 and an output node O1 of a stacked autoencoder, as shown in FIG. 5A. The stacked autoencoder may sequentially learn the feature vectors of intermediate nodes.

That is, the unsupervised feature vector learning unit 100 may learn the feature vectors by symmetrically placing the feature vectors, which are generated using the Mel-scale filter bank, on the input node I1 and the output node O1 of the stacked autoencoder and learning weight matrices W1, W2, W3, and W4 fully connected to the intermediate nodes (hidden nodes). Here, W' denotes a transpose matrix of W.

In addition, the unsupervised feature vector learning unit 100 may learn the feature vectors without supervision by arranging the extracted feature vectors on an input node I2 and an output node O2 of a convolutional autoencoder, as shown in FIG. 6A.

The above-described convolutional autoencoder is one method used in image pattern analysis, and consists of convolutional nodes and intermediate layers, wherein the convolutional nodes share a weight matrix according to a direction of weight and the intermediate layers have weight matrices for full connections to the nodes.

The unsupervised feature vector learning unit 100 may symmetrically place feature matrices, which are generated by grouping a spectrogram into 2-dimensional units, on the input node I2 and the output node O2 of the convolutional autoencoder, and may learn weight matrices W1, W2, W3, and W4 connected to the intermediate nodes. Here, W' denotes a transpose matrix of W.

Also, as shown in FIG. 7A, the unsupervised feature vector learning unit 100 may learn a feature vector without supervision by arranging the feature vector on an input node I3 and an output node O3 of a cross autoencoder, wherein the feature vector is extracted using the cross autoencoder into which the above-described stacked autoencoder and convolutional autoencoder are combined. In the case of use of the cross autoencoder, combined intermediate nodes may integrate characteristics for input data of the two characteristics described above.

Referring back to FIG. 2, the unsupervised feature vector learning unit 100 generates an artificial neural network including an acoustic pattern corresponding to the feature vector on the basis of the unsupervised learning result (S130).

That is, a network including the weight matrices learned by the unsupervised feature vector learning unit 100 may be generated as an artificial neural network as shown in FIG. 5B, FIG. 6B, or FIG. 7B. The artificial neural network may output an output value to a destination node P1, P2, or P3, in which the form of the output value allows acoustic patterns to be distinguished corresponding to a feature vector input to the input nodes I1, I2, and I3.

2. Automatic Phone Clustering Process

After the unsupervised learning process is performed by the unsupervised feature vector learning unit 100, the clustering unit 200 generates a phone set by clustering acoustic features which have been selected based on the unsupervised learning result (S210).

Specifically, when the clustering unit 200 receives the artificial neural network generated as a result of unsupervised learning from the unsupervised feature vector learning unit 100, the clustering unit 200 may generate the phone set by listing an output value for each piece of input data of the artificial neural network.

In this case, the clustering unit 200 may represent the output value for each piece of input data as a single vector, and may extract vectors whose distance therebetween is smaller than a specified bound value from among the listed vectors on the basis of top-down or bottom-up vector clustering. Then, the clustering unit 200 may average the extracted vectors to generate a group vector and may generate a phone set on the basis of the listed vectors and the generated group vector. According to this method, it is possible to generate a final phone set using a method of setting a boundary between a vector value indicating a phone and a neighboring phone.

According to another method, the clustering unit 200 may set the output node of the artificial neural network as one phone candidate, apply an active function, such as a softmax function, to each node, and generate the phone set by listing an index of the output node using an output value corresponding to each piece of input data.

That is, the clustering unit 200 lists the index of the output node using the output value for each piece of input data, and performs clustering, focusing on indices whose frequencies of being output are equal to or greater than a predetermined number of times. This approach is to combine indices whose frequencies of occurrence in an index column along a time axis are low with neighboring indices whose frequencies of occurrence are relatively high, thereby generating the phone set.

When the phone set is generated using either of the two methods described above, the clustering unit 200 allocates a sequence of phones to the speech data on the basis of the generated phone set (S220). In this case, the clustering unit 200 may arrange a candidate sequence of phones using the artificial neural network, extract a final sequence of phones distinguished by a clustering boundary on the basis of the generated phone set and the candidate sequence of phones, and allocate the final sequence of phones to the speech data.

3. Determined Phone-Based Acoustic Model Generation Process

After the automatic phone clustering process is performed by the clustering unit 200, the acoustic model generator 300 generates an acoustic model on the basis of the sequence of phones and the speech data to which the sequence of phones is allocated. The acoustic model generation process may use a Gaussian mixture model-hidden Markov model (GMM-HMM), a deep neural net-hidden Markov model (DNN-HMM) alone, a convolutional neural network (CNN), a recurrent neural network (RNN), or a combination thereof.

Specifically, the acoustic model generator 300 may use the speech data to which the sequence of phones is re-allocated and the sequence of phones to generate a context-independent phone sequence model (S310). This is the same as existing monophone learning, and the acoustic model generator 300 models a distribution or pattern of the phone set determined by the clustering unit 200.

Then, the acoustic model generator 300 generates a context-dependent tree on the basis of the context-independent phone sequence model and a combination according to the context of the sequence of phones (S320). In other words, the acoustic model generator 300 may generate the context-dependent tree in consideration of context with other neighboring phones. That is, the acoustic model generator 300 performs clustering in a direction in which entropy of learning data for all context-dependent phones that will be generated is reduced.

Thereafter, the acoustic model generator 300 defines a context-dependent phone state on the basis of the generated context-dependent tree (S330), and allocates the defined context-dependent phone state to the speech data using the sequence of phones (S340).

Then, the acoustic model generator 300 trains context-dependent phone state models using a deep learning method on the basis of information on the allocated context-dependent phone state and the speech data which is learning data (S350). In this case, the acoustic model generator 300 may re-allocate the sequence of phones to the speech data used as the learning data by use of the trained context-dependent phone state models, and re-trains the context-dependent phone state models on the context-dependent phone state on the basis of the information on context-dependent phone state derived from the re-allocated sequence of phones and the speech data. As described above, according to one embodiment of the present invention, repetitive learning is iteratively performed so that an accurate context-dependent phone state model may be incrementally generated.

4. Pronunciation Dictionary Generation Process

Figure 8:
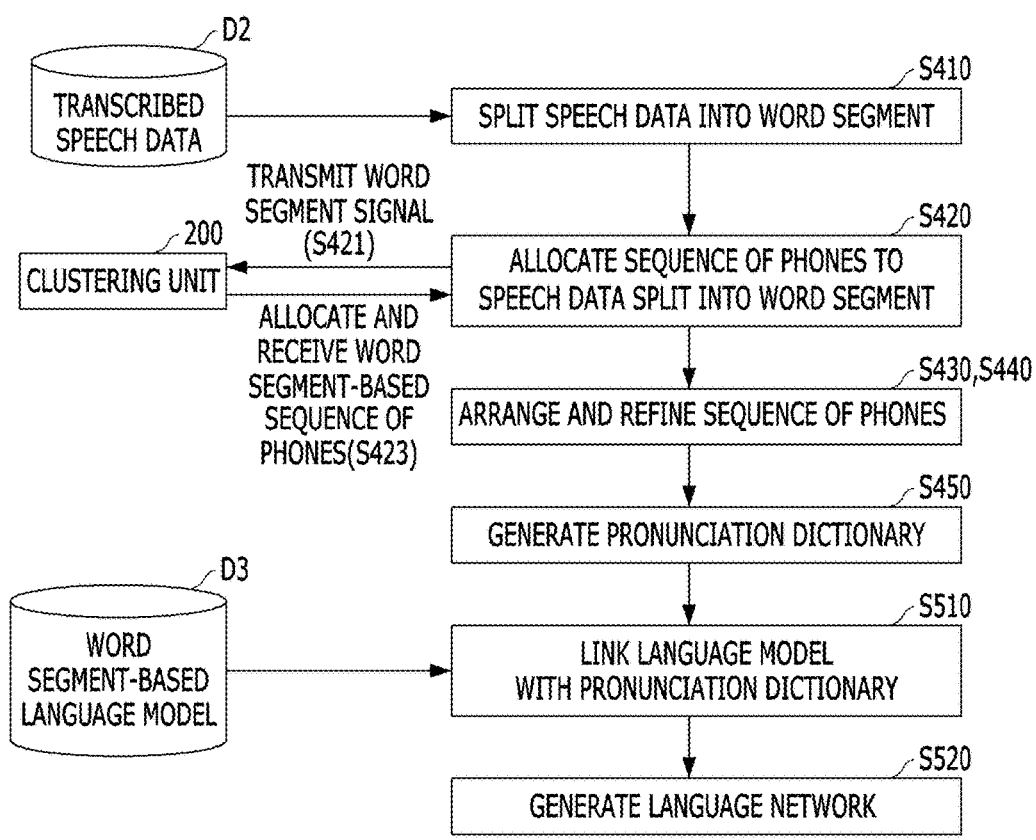
FIG. 8 is a flowchart illustrating a method of generating a pronunciation dictionary and a language network.

FIG. 8 is a flowchart illustrating a method of generating a pronunciation dictionary and a language network.

Generally, a speech recognition system processes a speech signal using a language network and an acoustic model to which a language model is applied. A general language network is generated using a language model generated by a training corpus and a pronunciation dictionary created by G2P conversion of a training corpus.

On the contrary, the speech recognition system 1 according to one embodiment of the present invention may create a space separated word segment-based pronunciation dictionary on the basis of speech data whose transcription exists, as shown in FIG. 8, and when data is lacking, the pronunciation dictionary may be expanded by substituting connections in units of syllables.

Then, a language network may be created by linking the created pronunciation dictionary with the language model generated by a learning (training?) corpus. In this case, because a space-separated word segment is a unit of vocalization, the word segment-based pronunciation dictionary can be represented by including various pronunciation variations occurring in natural language continuous pronunciation.

Specifically, the pronunciation dictionary generator 400 splits transcribed speech data into sections in units of word segment by measuring the pitch and energy interval of a signal (S410).

In this case, the word segment is composed of a single word or a group of words which is a unit of word spacing or pause reading. For example, a word segment of Korean language may be composed of a noun and a postposition or even a single noun. In alphabetic languages, each word usually becomes a word segment, but a shortened word or a successively uttered short phrase may be treated as a word segment. In addition, in Japanese, Chinese, or other languages that are written without inter-word spaces, a reading pause which identifies semantic grouping may serve as a word segment.

In the case where word spacing and reading pauses of transcription match with each other, the transcription may be easily allocated to a speech signal in units of word segments using the pitch and energy interval. However, in the case where word spacing does not match with reading pauses or a language is not written with spaces, another speech recognizer may be used to forcibly align transcription to a time axis of the speech data.

Then, the pronunciation dictionary generator 400 allocates a sequence of phones to the transcribed speech data split into word segments (S420), and the sequence of phones corresponding to the word segments of the transcribed speech data to which the sequence of phones is allocated is arranged (S430). In this case, an uttered sequence of phones corresponding to the word segment varies from utterance to utterance, and the sequence of phones may be uttered differently from one speaker to another speaker, and hence multiple pronunciations are obtained when the sequence of phones is measured.

Then, the pronunciation dictionary generator 400 refines the arranged sequence of phones on the basis of the time axis and the number of frames (S440). At this time, the pronunciation dictionary generator 400 may refine the sequence of phones by merging phones that repeatedly appear along the time axis in the sequence of phones in units of frames and eliminating phones appearing in too few frames.

When the sequence of phones is arranged and refined as described above, the pronunciation dictionary generator 400 generates a word segment-based phone sequence pronunciation dictionary on the basis of the refined sequence of phones (S450).

In this case, the pronunciation dictionary generator 400 may generate a pronunciation dictionary based on syllables or partial word segments generated by splitting the word segment of the transcribed speech data in order to link a word that does not match with the word segment. The partial word segment or syllable-based pronunciation dictionary may be generated by gathering sequences of pronunciations of word segments including text corresponding to a partial word segment of interest or syllables, comparing and sampling the sequences of phones of the relevant common text, and re-allocating phones having average frequencies of occurrence or multiple phones to the sequence of the phones.

5. Word Segment-Based Language Network Generation Process

When the pronunciation dictionary generator 400 generates the pronunciation dictionary, the language network generator 500 links the word segment-based language model generated by the learning corpus with the pronunciation dictionary (S510), thereby generating a language network (S520).

In this case, the word segment-based language model may be generated by changing a semantic morpheme unit based on existing morpheme analysis to a word segment-based unit grouping. The objective of this approach is to estimate a probability of vocalization using word segment-based statistics, in which the word segment is processed as a basic recognition unit. Also, this method implies that speech recognition is attempted based on word segments which are groupings of spoken words similar to semantic primitives which a human being learns and perceives.

Meanwhile, the language network generator 500 may expand a word segment-based pronunciation dictionary by linking words of the language model which are not included in the word segment-based pronunciation dictionary with the partial word segment or syllable-based pronunciation dictionary.

As described above, the language network generator 500 may generate the language network by linking the language model with the generated or expanded pronunciation dictionary. In this case, because the word segment is composed of one or more words, existing language models composed of a single word can be complexly combined with the embodiment of the present invention.

After the language network is generated as described above, the speech recognition decoder 700 may generate a speech recognition result using the acoustic model and the language network.

In detail, when the feature vector extractor 600 extracts a feature vector from speech data input by a user, the speech recognition decoder 700 receives the feature vector, which is an input of the speech recognition decoder 700, by applying the acoustic model and the language network, and generates a speech recognition result by extracting a sequence of words of the speech data on the basis of the input result.

In this case, the feature vector extractor 600 may extract the feature vector using the method described with reference to FIG. 4, and may also extract the feature vector using another method different from the method of FIG. 4.

In the above description, operations S301 to S521 may be further separated into additional operations or combined into fewer operations according to an implementation of the present invention. In addition, some operations may be omitted according to necessity and the sequence of the operations may be changed.

The speech recognition method in the speech recognition system 1 according to one embodiment of the present invention may be realized in the form of a computer program stored in a medium executed by a computer or in the form of a recording media that contains instructions executable by a computer. The computer-executable recording medium may be any available medium that may be accessed by computers, and includes any of volatile and nonvolatile media and separated and integrated media. In addition, the computer-executable recording medium may include all of computer storage media and communication media. The computer storage media include any of volatile, nonvolatile, separated and integrated media, which are realized by any methods or technologies for storing information, such as computer-readable instructions, data structures, program modules or other types of data. Typically, the communication media include computer-readable instructions, data structures, program modules, other types of data of modulated data signals such as carrier waves, or other transmission mechanisms, and include any information transfer media.

According to one aspect of the present invention, a pronunciation dictionary is generated based on utterance data, which emerges from constraints of existing G2P for generating a pronunciation dictionary based on rules and lexicon. Therefore, it is possible to reflect observed variable pronunciations in the advance, and hence phonetic disparity between pronunciation change rules and actual uttered sounds can be reduced, thereby overcoming limitations of spontaneous speech recognition.

In addition, since phones are determined from speech data and an acoustic model is generated using information about the phones, there is an advantage that acoustic modeling can be performed only with the speech data even in a situation where it is difficult to collect a large quantity of transcribed speech data.

Moreover, since the pronunciation dictionary is generated by segmenting spoken transcription, a speech recognition unit is re-constructed based on a high frequency word segment serving as a grouping of spoken words, or semantic primitives corresponding to a phrase, which is different from an existing speech recognition unit that uses a pseudo-morpheme or a word, and thereby a speech recognition performance that is more familiar to the human perception can be provided.

Also, it is possible to expand the pronunciation dictionary by adapting the dictionary to regional dialects or to the speech style of individuals using transcribed speech data.

In addition, in the case of foreign language pronunciation change rules, it is impossible for an ordinary user who is not a native language expert to access the rules, which hinders multilingual expansion. However, according to one embodiment of the present invention, it is easy to realize multilingual expansion.

Furthermore, when new vocabulary is to be added to a speech recognition system, it is easy to add the vocabulary by inputting and pronouncing a word.

Although the method and system of the invention have been described in connection with specific embodiments of the present invention, some or all of the components or operations thereof may be realized using a computer system that has a hardware architecture for general-use.

The foregoing description of the present invention is for illustrative purposes, and those of ordinary skill in the art will appreciate that other specific modifications may be easily made without departing from the technical spirit or essential features of the invention. Therefore, the foregoing embodiments should be regarded as illustrative rather than limiting in all aspects. For example, some components, each of which has been described as being a single form, may be embodied in a distributed form, whereas some components, which have been described as being distributed, may be embodied in a combined form.

The scope of the present invention is not defined by the detailed description as set forth above but by the accompanying claims of the invention. It should also be understood that all changes or modifications derived from the definitions and scopes of the claims and their equivalents fall within the scope of the invention.

What is claimed is:

1. A speech recognition method which allows phones to be automatically generated, comprising:
   unsupervisedly learning a feature vector of speech data;
   generating a phone set by clustering acoustic features selected based on an unsupervised learning result;
   allocating a sequence of phones to the speech data on the basis of the generated phone set;
   generating an acoustic model on the basis of the sequence of phones and the speech data to which the sequence of phones is allocated; and
   generating a speech recognition result by a speech recognition decoder using the acoustic model and a language network.

2. The speech recognition method of claim 1, wherein the speech data is untranscribed speech data.

3. The speech recognition method of claim 2, wherein the unsupervisedly learning of the feature vector of the speech data includes:
   extracting the feature vector from the speech data;
   unsupervisedly learning the extracted feature vector; and
   generating an artificial neural network including an acoustic pattern that corresponds to the feature vector based on the unsupervised learning result.

4. The speech recognition method of claim 3, wherein the extracting of the feature vector from the speech data includes:
   converting the speech data into a spectrogram;
   generating a first feature vector by converting the speech data, which is converted into the spectrogram, into the first feature vector using a Mel-scale filter bank in a predetermined time frame unit; and
   splicing left and right windows of the first feature vector according to a predetermined number of frames and generating a second feature vector,
   wherein the generated second feature vector is extracted as the feature vector.

5. The speech recognition method of claim 4, wherein the unsupervisedly learning of the extracted feature vector includes unsupervisedly learning the feature vector by arranging the extracted feature vector on an input node and an output node of a stacked autoencoder.

6. The speech recognition method of claim 3, wherein the extracting of the feature vector from the speech data includes:
   converting the speech data into a spectrogram; and
   generating a feature matrix by grouping the speech data converted into the spectrogram into 2-dimensional units of x frames,
   wherein the generated feature matrix is extracted as the feature vector.

7. The speech recognition method of claim 6, wherein the unsupervisedly learning of the extracted feature vector includes unsupervisedly learning the feature vector by arranging the extracted feature vector on an input node and an output node of a convolutional autoencoder.

8. The speech recognition method of claim 3, wherein the generating of the phone set by clustering the acoustic features selected based on the unsupervised learning result includes generating the phone set by listing an output value for each piece of input data of the artificial neural network.

9. The speech recognition method of claim 8, wherein the generating of the phone set includes:
   representing the output value for each piece of input data as a vector and listing vectors;
   extracting vectors whose distance therebetween is equal to or smaller than a specific bound value from the listed vectors on the basis of vector clustering;
   generating a group vector by averaging the extracted vectors; and
   generating the phone set on the basis of the listed vectors and the generated group vector.

10. The speech recognition method of claim 8, wherein the generating of the phone set includes:
    listing an index of a node using the output value for each piece of input data; and
    generating the phone set by performing the clustering, focusing on indices whose frequencies of being output are equal to or greater than a predetermined number of times among the listed indices.

11. The speech recognition method of claim 8, wherein the allocating of the sequence of phones to the speech data includes:
    listing a candidate sequence of phones on the basis of the artificial neural network; and
    allocating a final sequence of phones to the speech data by extracting the final sequence of phones on the basis of the generated phone set and the candidate sequence of phones.

12. The speech recognition method of claim 11, wherein the generating of the acoustic model includes:
    generating a context-independent phone sequence model using the sequence of phones and the speech data to which the sequence of phones is re-allocated;
    generating a context-dependent tree on the basis of the context-independent phone sequence model and a combination according to the context of the sequence of phones;
    defining a context-dependent phone state on the basis of the context-dependent tree;
    allocating the defined context-dependent phone state to the speech data using the sequence of phones; and
    training context-dependent phone state models on the basis of information on the allocated context-dependent phone state and the speech data.

13. The speech recognition method of claim 12, wherein the training of the context-dependent phone state models includes:
    re-allocating the sequence of phones to the speech data using the trained context-dependent phone state models; and
    re-training the context-dependent phone state models on the basis of the speech data and information on context-dependent phone state derived from the re-allocated sequence of phones.

14. The speech recognition method of claim 1, further comprising generating a space-separated word segment-based pronunciation dictionary on the basis of transcribed speech data,
- wherein the generating of the space-separated word segment-based pronunciation dictionary includes:
- splitting the transcribed speech data into sections in units of word segment;
- allocating the sequence of phones to the transcribed speech data which is split into the word segments;
- arranging the sequence of phones to a corresponding word segment of the transcribed speech data to which the sequence of phones is allocated;
- refining the arranged sequence of phones on the basis of a time axis and the number of frames; and
- generating the space-separated word segment-based pronunciation dictionary on the basis of the refined sequence of phones.

15. The speech recognition method of claim 14, wherein the generating of the space-separated word segment-based pronunciation dictionary includes generating the pronunciation dictionary in units of syllables or partial word segments generated by splitting a word segment of the transcribed speech data.

16. The speech recognition method of claim 15, further comprising:
- linking a word segment-based language model generated by a learning corpus with the generated pronunciation dictionary; and
- generating a language network according to the linking result.

17. The speech recognition method of claim 16, wherein the linking of the word segment-based language model with the pronunciation dictionary includes expanding the word segment-based pronunciation dictionary by linking words of the language model which are not included in the word segment-based pronunciation dictionary with the pronunciation dictionary in units of partial word segments or syllables.

18. The speech recognition method of claim 16, further comprising:
- extracting a feature vector from speech data input by a user;
- inputting the feature vector to the speech recognition decoder to which the generated acoustic model and the language network are applied; and
- generating the speech recognition result by extracting a sequence of words of the input speech data on the basis of a result of inputting.

19. A speech recognition system which allows phones to be generated, comprising:
- a memory configured to store a program for speech recognition; and
- a processor configured to execute the program stored in the memory,
- wherein the processor performs unsupervised learning by extracting a feature vector from untranscribed speech data upon executing the program, generates a phone set by clustering acoustic features selected based on an unsupervised learning result, allocates a sequence of phones to the speech data on the basis of the generated phone set, generates an acoustic model on the basis of the sequence of phones and the speech data to which the sequence of phones is allocated, and generates a speech recognition result using the acoustic model and a language network.

* * * * *